US011404824B2

(12) United States Patent
Kropiewnicki et al.

(10) Patent No.: US 11,404,824 B2
(45) Date of Patent: Aug. 2, 2022

(54) ATTACHMENT HOUSING ARRANGEMENT AND METHOD FOR UNLOCKING

(71) Applicant: HARTING Electric Stiftung & Co. KG, Espelkamp (DE)

(72) Inventors: Norbert Kropiewnicki, Bielefeld (DE); Walter Gusew, Osnabrück (DE)

(73) Assignee: HARTING Electric Stiftung & Co. KG, Espelkamp (DE)

( * ) Notice: Subject to any disclaimer, the term of this patent is extended or adjusted under 35 U.S.C. 154(b) by 462 days.

(21) Appl. No.: 16/603,294

(22) PCT Filed: Apr. 16, 2018

(86) PCT No.: PCT/DE2018/100359
§ 371 (c)(1),
(2) Date: Oct. 7, 2019

(87) PCT Pub. No.: WO2018/192624
PCT Pub. Date: Oct. 25, 2018

(65) Prior Publication Data

US 2021/0111516 A1 Apr. 15, 2021

(30) Foreign Application Priority Data

Apr. 21, 2017 (DE) ..................... 10 2017 108 490.8
Nov. 6, 2017 (DE) ..................... 10 2017 125 860.4

(51) Int. Cl.
*H01R 13/639* (2006.01)
*H01H 13/50* (2006.01)
(Continued)

(52) U.S. Cl.
CPC ........... *H01R 13/639* (2013.01); *H01H 13/50* (2013.01); *H01H 71/52* (2013.01);
(Continued)

(58) Field of Classification Search
CPC .......... H01R 13/7036; H01R 13/62955; H01R 13/633; H01R 13/713; H01R 13/717;
(Continued)

(56) References Cited

U.S. PATENT DOCUMENTS 5,361,612 A * 11/1994 Voiculescu ............. E05C 17/36 70/279.1
5,456,135 A * 10/1995 Li .......................... B62K 21/16 403/103
(Continued)

FOREIGN PATENT DOCUMENTS

CN 1137694 A 12/1996
CN 102017319 A 4/2011
(Continued)

*Primary Examiner* — Jared Fureman
*Assistant Examiner* — Esayas G Yeshaw
(74) *Attorney, Agent, or Firm* — Smartpat PLC

(57) ABSTRACT

Plug connections and in particular plug connections for use in an industrial environment are presented. An attachment housing arrangement has an attachment housing for accommodating a hood of a plug connector with plug contacts and a mechanical locking arrangement for mechanically locking the hood on the attachment housing. Also presented is a method for unlocking a mechanical locking of a hood of a plug connector with plug contacts on an attachment housing of an attachment housing arrangement. The attachment housing arrangement is provided with a fixing arrangement for fixing the mechanical locking arrangement at least in a locking state, and with a control unit for controlling the fixing arrangement, the control unit being configured to control the fixing arrangement so as to release a fixing of the locking arrangement only when the plug contacts are free of current and free of voltage within predefined tolerances.

13 Claims, 5 Drawing Sheets

(51) Int. Cl.
*H01H 71/52* (2006.01)
*H01R 13/629* (2006.01)
*H01R 13/633* (2006.01)
*H01R 13/703* (2006.01)
*H01R 13/717* (2006.01)
*H01H 71/08* (2006.01)

(52) U.S. Cl.
CPC ..... *H01R 13/62955* (2013.01); *H01R 13/633* (2013.01); *H01R 13/7036* (2013.01); *H01R 13/717* (2013.01); *H01H 71/08* (2013.01)

(58) Field of Classification Search
CPC ...... H01R 13/639; H01H 71/52; H01H 71/08; H01H 13/50
See application file for complete search history.

(56) References Cited

U.S. PATENT DOCUMENTS

| | | | | |
|---|---|---|---|---|
| 5,658,162 | A | 8/1997 | Harting et al. | |
| 5,954,548 | A | 9/1999 | Stabroth | |
| 6,319,050 | B1 | 11/2001 | Miyazaki et al. | |
| 6,416,362 | B1 * | 7/2002 | Conrad | H01R 13/6397 439/651 |
| 6,863,551 | B2 | 3/2005 | Fukamachi | |
| 7,080,889 | B2 * | 7/2006 | Ling | H01R 13/6397 200/50.02 |
| 8,449,314 | B1 | 5/2013 | Feist et al. | |
| 8,900,006 | B2 * | 12/2014 | Gaul | B60L 53/65 439/489 |
| 9,385,473 | B2 | 7/2016 | Iwatani | |
| 9,742,128 | B2 * | 8/2017 | Justice | H01R 13/6683 |
| 9,812,813 | B1 | 11/2017 | Sakamoto et al. | |
| 2002/0057550 | A1 | 5/2002 | Ulrich | |
| 2011/0034049 | A1 | 2/2011 | Shishikura et al. | |
| 2012/0186309 | A1 | 7/2012 | Ishida et al. | |
| 2012/0276766 | A1 | 11/2012 | Schlögl | |
| 2012/0318645 | A1 | 12/2012 | Kobayashi et al. | |
| 2013/0040486 | A1 * | 2/2013 | Kurumizawa | B60L 53/16 439/350 |
| 2013/0309898 | A1 | 11/2013 | Mizuno et al. | |
| 2014/0292276 | A1 | 10/2014 | Osawa et al. | |
| 2015/0079830 | A1 | 3/2015 | Iwatani | |
| 2016/0202091 | A1 * | 7/2016 | Yin | E05B 47/0001 70/263 |
| 2017/0047679 | A1 | 2/2017 | Garth | |
| 2017/0328130 | A1 * | 11/2017 | Baker | E06B 9/80 |
| 2019/0222212 | A1 * | 7/2019 | Wang | H03K 17/9517 |

FOREIGN PATENT DOCUMENTS

| | | | |
|---|---|---|---|
| CN | 102893462 | A | 1/2013 |
| CN | 103329363 | A | 9/2013 |
| CN | 104145382 | A | 11/2014 |
| CN | 104425938 | A | 3/2015 |
| CN | 104577552 | A | 4/2015 |
| CN | 106030926 | A | 10/2016 |
| DE | 60016140 | | 11/2005 |
| DE | 102009042568 | | 3/2012 |
| DE | 102014017625 | A1 | 6/2015 |
| EP | 0731534 | B1 | 12/1999 |
| EP | 1017262 | A1 | 7/2000 |
| EP | 2059979 | | 12/2007 |
| EP | 2293392 | B1 | 3/2011 |
| EP | 2535913 | | 12/2012 |
| EP | 2705974 | A1 | 3/2014 |
| JP | 2013182858 | A | 9/2013 |
| JP | 2016110735 | A | 6/2016 |
| WO | 2013132808 | A1 | 9/2013 |

* cited by examiner

ATTACHMENT HOUSING ARRANGEMENT AND METHOD FOR UNLOCKING

TECHNICAL FIELD

The present invention relates in general to the field of plug connections and in particular to plug connections in an industrial environment. Specifically, the present invention relates to an attachment housing arrangement with an attachment housing for accommodating a hood of a plug connector with plug contacts and a mechanical locking arrangement for mechanically locking the hood to the attachment housing, and relates to a method for unlocking a mechanical locking of a hood of a plug connector with plug contacts to an attachment housing of an attachment housing arrangement.

BACKGROUND

Arrangements are known in which hoods and attachment housings of a plug connection are locked together by a mechanical lock, wherein the lock is in particular of significance in that the plug connection is secured against being accidentally undone, so that the plug connection still exists if, perhaps, an occasional tug occurs on the line, wherein the lock is also effective against shaking loose as a result of vibrations.

SUMMARY

An aim underlying the present invention is that of presenting an attachment arrangement and a method for unlocking that is further developed in comparison with the known prior art.

According to a first aspect, an attachment housing arrangement is proposed with an attachment housing for accommodating a hood of a plug connector with plug contacts. The housing arrangement includes a mechanical locking arrangement for mechanically locking the hood to the attachment housing and a fixing arrangement for fixing the mechanical locking arrangement at least in a locking state. The housing arrangement further includes a control unit for controlling the fixing arrangement. The control unit is configured to control the fixing arrangement so as to release a fixing of the locking arrangement only when the plug contacts are free of current and free of voltage within predefined tolerances.

According to a second aspect, a method is proposed for unlocking a mechanical locking of a hood of a plug connector with plug contacts to an attachment housing of an attachment housing arrangement. The method in which the attachment housing arrangement comprises a fixing arrangement which fixes the mechanical locking arrangement in a locking state, includes the steps of checking for a freedom of the plug contacts from current and voltage within predefined tolerances. The method further includes releasing the fixing of the locking arrangement by the fixing arrangement after the check if the plug contacts are free of current and voltage within the predefined tolerances, and unlocking the locking of the hood after release of the fixing.

Part of the background of the present invention is to be found in the following considerations.

Security against unintentionally undoing the plug connection, such as in the presence of a tug on the line or through vibrations during operation, is provided with the aid of the mechanical locking arrangement, so that improved operational security is provided in comparison with a plug connection without a lock. The lock which conventionally is to be undone directly by a user however does not provide any security against a deliberately caused undoing of the plug connection, which as such can be associated with a security risk for the operation and in particular the user.

It has been found that it is desirable to develop the handling of a plug connection in such a way that there is improved security, wherein it is to be ensured that the plug connector cannot be withdrawn when under load, and that no hazardous voltage is present (any more) on the machine side even when a load per se is disconnected/switched off.

If, in particular, a combination of locking the plug connector, measuring current/voltage, and sensors that acquire the state of the device are provided, these technical features can interact with one another and characterize the method of the locking or unlocking.

It is possible to better ensure that the plug connector is not withdrawn when under load, while it is preferably arranged that in the unplugged state the mains-side power contacts are always switched to be free of voltage. The machine side is also checked for being free of voltage before the unlocking procedure. The mechanism remains in particular locked as long as a potentially hazardous residual voltage is (still) present on the machine side. The protection of persons and of the machine can thus be improved with the invention.

In one advantageous embodiment, the attachment housing arrangement further comprises a circuit interrupter, in particular a contactor, to interrupt a line that leads to a plug contact, and a voltage measuring unit for measuring a voltage present at the plug contact, wherein the voltage measuring unit is arranged, in terms of the line, between the circuit interrupter and the plug contact.

A disconnection of the plug connection from the mains side can be achieved with the aid of the circuit interrupter, wherein the voltage measuring unit between the circuit interrupter and the plug contacts serves to capture a (residual) voltage that is possibly also still present in the state which is per se switched off, in order in this case to avoid an endangerment through this (residual) voltage which otherwise would be accessible on undoing of the plug connection.

In another advantageous embodiment, the mechanical locking arrangement comprises at least one locking clip which engages with the hood in the locked state, wherein the fixing arrangement comprises a fixing slide that is placed against the locking clip by a spring loading, and a fastener for the fixing slide in a position lying against the locking clip when in the locking state.

The use of locking clips for locking is known as such, wherein, however, known locking clips can advantageously be developed with a fastenable fixing slide for use without a modification being necessary at the locking clip itself. This allows conventional attachment housings also to be used.

With a fixing slide that follows the locking clip as a consequence of a spring loading, and a fastener of the fixing slide, the locking clip is only fastened indirectly.

It is also, however, possible to provide a direct fastening of the locking clip itself.

Other approaches can also be used to design the fixing slide or a comparable element so that it lies as continuously as possible against the locking clip, such as through a magnetic coupling or a direct connection in which the fixing slide is fastened to the locking clip itself.

In a particularly advantageous embodiment, the locking clip can itself have a latching mechanism for its fixing in the locking state. The locking clip can, in particular, comprise latching means, in particular a spring-loaded, retractable latching hook for blocking the pivoting movement of the locking clip in its locking state. This is particularly advantageous when the locking clip has a locking region and an actuation region between which a bearing axis is arranged. The locking clip can particularly advantageously be held at the attachment housing in a pivoting manner in the form of a rocker by means of this bearing axis. The latching mechanism can then advantageously be arranged in or at the actuation region of the locking clip, and can in particular be a component of this actuation region.

This has the advantage that, for locking the hood on the one hand the actuation region of the locking clip can be moved towards the attachment housing, while thereby on the other hand the locking region of the locking clip is pivoted in the opposing direction, i.e. moving away from the attachment housing, with its rear-running locking ends pivoting over latching pins of the hood in order to lock the hood at the attachment housing. In this locking state, the locking clip is then at least in the vicinity of the attachment housing with its actuation region and, in particular, with its latching mechanism, and can thus latch in a particularly advantageous manner at the correspondingly modified fixing arrangement of the attachment housing.

The locking clip can in particular have a U-shaped basic form with an actuation handle and two side pieces extending perpendicularly therefrom, wherein the free ends of the side pieces (i.e. their ends) form the locking region. The actuation handle, on the other hand, belongs to the actuation region. A fastening apparatus for the bearing axis can be located in each of the two side pieces. This fastening apparatus can, for example, consist of a cylindrical through-opening as an end receptacle for the bearing axis. The bearing axis and, in particular, the fastening apparatus of the side pieces provided for it, can thus be considered as a boundary between the actuation region and the locking region of the locking clip.

In one preferred embodiment, the fixing arrangement of the attachment housing can be modified in such a way that it comprises an unlatching lever that is connected to a plunger of a solenoid magnet. An unlatching hook can be formed at the end of the unlatching lever to operate together with the latching mechanism. For unlocking, the said latching hook can be lowered by spring force into the locking clip, i.e. in other words pushed into the locking clip, in particular into a receiving chamber provided for it by means of this unlatching lever and in particular by means of the unlatching hook, in order to release the locking clip from the latch. The locking clip can thereupon be manually undone, i.e. transferred from its locking position into its unlocking position.

The previous unlatching can thus be effectuated through the solenoid magnet, i.e. finally, for example, by an electrical signal, in particular a flow of electrical current through a coil of the solenoid magnet. In the normal state, i.e. when no electrical signal of this sort exists, the latching hook of the latching mechanism is automatically located in its latching position as a result of the spring force. This is particularly advantageous for security reasons, because in this way an unintentional unlocking e.g., as a consequence of a current failure, that is, for example, through a disconnection of the corresponding contact from a corresponding current source etc., is avoided. In the normal state the locking clip is then latched in its locking position. A current must accordingly flow, e.g. through the coil of the solenoid magnet, to release the locking clip.

The latching mechanism can comprise a receiving chamber, preferably arranged centrally in the actuation region of the locking clip, to accommodate the latching hook. The receiving chamber can have a window facing in the direction of the fixing arrangement in the locked state. Opposite the window, the receiving chamber can have a retaining hole, in particular in the form of a cylindrical hole. A locking axis, in particular having a cylindrical form, can be held with its first end in a sliding manner in this retaining hole, while the locking axis protrudes with a second end, which is located opposite the first end, into the interior of the receiving chamber. The latching hook can be attached at this second end, e.g. being screwed or molded on.

The said spring loading of the latching hook can then preferably be generated by a helical spring. The locking axis can reach through the helical spring for this purpose. The helical spring can engage at an inner wall of the receiving chamber at the region around the retaining hole at the one end, and at the latching hook at the other end. As a result it is configured to push the latching hook out of its unlocking position at least partially through the window into its latching position with the spring force of the helical spring. At its end that protrudes out of the window, the latching hook has a slide slope and a latching surface, with which it interacts in a locking manner with the fixing arrangement as the locking lever is closed. This interaction can be configured in such a way that as the locking clip is closed, the locking clip is first pushed by its slide slope against the spring force into the receiving chamber in order then to slide due to the spring force of the helical spring into a latching recess or at least to latch against a locking surface of a latching apparatus of the attachment housing. Bordering the locking axis, the latching hook can comprise at least one step directed from the inside in the direction of the window as a stop, so that it cannot be pushed all the way out of the window by the spring force of the helical spring.

Conventionally, two locking clips lying opposite one another are often used, in which case these are preferably (but not necessarily) both designed as described here.

In another advantageous embodiment, a position capture is provided that is configured to capture whether the locking arrangement is in the locking state.

The position capture reports the state of the locking to the control unit, which can then carry out corresponding control actions.

In one preferred variant of the above embodiment, the attachment housing arrangement comprises a circuit interrupter, in particular a contactor, to interrupt a line that leads to a plug contact, wherein the control unit is configured to control the circuit interrupter, wherein the control unit only controls the circuit interrupter to close the line when the position capture ascertains that the locking arrangement is in the locking state.

The information relating to the locked state can thus be used to prevent the possibility that a voltage from the mains side reaches the contacts in the attachment housing while the plug connection itself has not yet been reached.

In an advantageous development of the above variant, the attachment housing arrangement comprises an operating unit, wherein the control unit is configured only to control the circuit interrupter to close the line in response to an operation of the operating unit.

If in addition an operation by a user is provided as a condition for a release of the mains-side voltage or the mains current at the plug connection, this further increases the general security.

In another advantageous embodiment, the attachment housing arrangement comprises an operating unit, wherein the control unit is configured only to control the fixing arrangement to release the fixing of the locking arrangement in response to an operation of the operating unit.

In the context of this embodiment, at least two mutually independent operations are provided, namely the operation of the operating unit, e.g. in the form of pressing a button or the like, and undoing the lock, so that here again in this way a generally better security can be achieved.

In another advantageous embodiment of an aspect, a signal output unit is provided that is configured to output a signal indicating an operating state of the attachment housing arrangement.

The use of a signal output makes it possible for the user to recognize the state of the plug connection or of the arrangement as a whole in a simple manner, so that the user can also recognize what steps are at that time possible or what steps may be necessary in order, for example, to undo the plug connection.

According to a further aspect, a computer program with program means is provided which cause the control unit of an attachment housing arrangement to release the fixing of the locking arrangement by the fixing arrangement after checking for a freedom of the plug contacts from current and voltage within predefined tolerances if the plug contacts are free of current and voltage within the predefined tolerances when the computer program is executed by the control unit.

Features of advantageous forms of embodiment of the invention are defined in the subsidiary claims, wherein for the expert further advantageous features, embodiments and designs are also to be found in the above explanation and the following discussion.

DETAILED DESCRIPTION

In the appended drawings and in the explanations for these drawings, elements that correspond to one another or are in relationship to one another are—to the extent useful—identified with mutually corresponding or similar reference signs, even when they are to be found in different exemplary embodiments.

Figure 1:
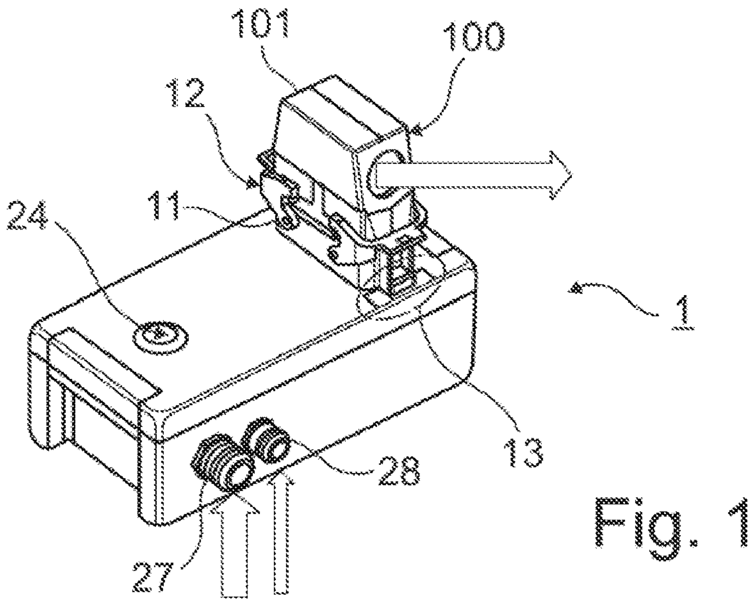
FIG. 1 shows a view of an attachment housing arrangement according to one exemplary embodiment of the invention.

FIG. 1 shows a view of an attachment housing arrangement 1 according to one exemplary embodiment of the invention.

The attachment housing arrangement 1 comprises a mains connection 27 and an Ethernet connection 28, and is fitted with an operating unit 24 in the form of a button. An attachment housing 11 which—in the manner known per se—is fitted with locking clips 12 is located at the attachment housing arrangement 1.

Deviating from the known solutions, the attachment housing arrangement 1 is also provided with a fixing arrangement 13 with which the locking clip 12 can be fastened in a locking state.

Further elements of the attachment housing arrangement 1 are described further below with reference to further figures.

The attachment housing arrangement 1 can also be referred to as a "wall box", and is illustrated here with a plug 100 with a hood 101 plugged onto the attachment housing 11.

The arrows show schematically the supply of power to the mains connection 27 and Ethernet signals to the Ethernet connection 28, wherein the cable (not illustrated) that is attached at the plug connector 100 is a hybrid cable for transmitting power and Ethernet signals together.

The fixing arrangement 13 fixes the locking clip 12 and prevents the plug connector 100 from being withdrawn under load. Only when no current is flowing, and when there is no dangerous voltage present in the plug region, can the locking mechanism unlock (the fixing arrangement release the fixing of the locking clip) through the actuation of the button 24 as an example of an operating unit. The locking clip can now be opened and the plug withdrawn, which provides good protection to persons and the machine.

Figure 2:
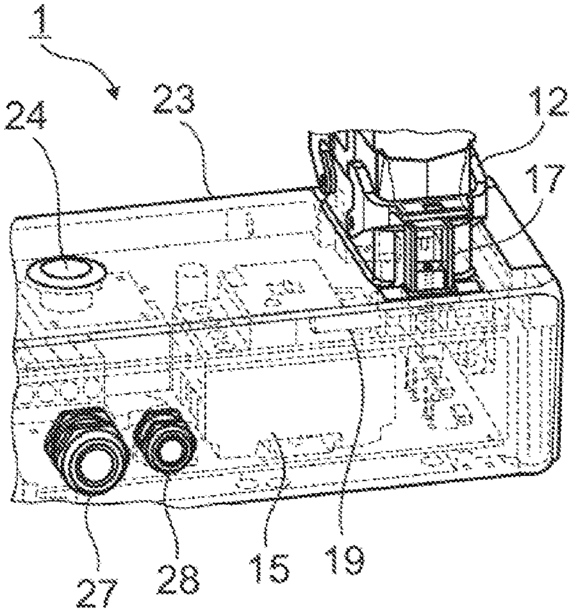
FIG. 2 shows a further, partially transparently illustrated view of the attachment housing arrangement of FIG. 1.
Figure 3:
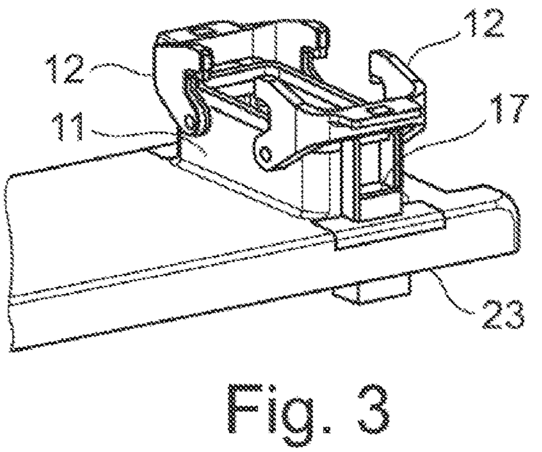
FIG. 3 shows an illustration of a cover with an attachment housing of the attachment housing arrangement of FIG. 1.

FIG. 2 shows a further, partially transparently illustrated view of the attachment housing arrangement 1 of FIG. 1, and FIG. 3 shows an illustration of the cover 23 with the attachment housing 11 of the attachment housing arrangement 1 of FIG. 1.

The attachment housing arrangement 1 comprises a cover 23 which is provided with the attachment housing 11. The cover 23 includes an interior space of the attachment housing arrangement 1 in which, inter alia, a circuit board with a circuit interrupter 15 in the form of a contactor, and also the fastener 19 of the fixing arrangement 13 are housed. The cover 23 is also provided with the button 24.

The way in which the attachment housing 11 is provided with the locking clips 12 can be seen in particular in FIG. 3, wherein a fixing slide 17 which is held against the corresponding locking clip 12 by a spring (see FIG. 4) is provided in each case and, in combination with the fastener 19, holds it in place.

The geometry of an attachment housing 11 is integrated into the cover 23; as a result, the corresponding hood 101 (see FIG. 1) is plug-compatible, and can be locked by the locking clip 12. The fixing mechanism 17, which can fix the clip 12 according to the operating state, is located underneath the locking clip 12 (on both sides).

Figure 4:
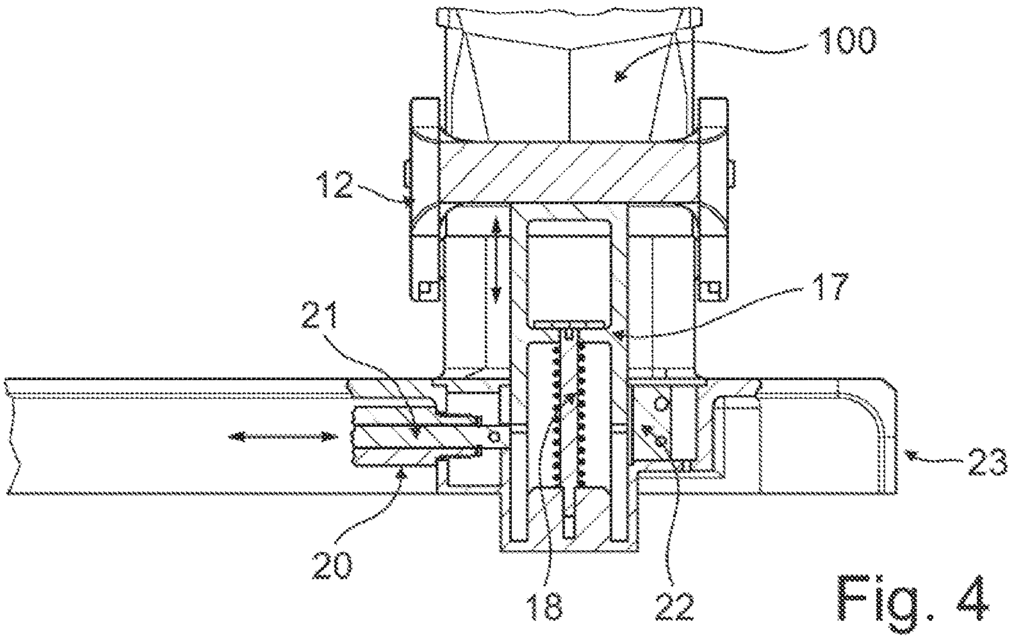
FIG. 4 shows a schematic sectional view of a part of an attachment housing arrangement.

FIG. 4 shows a schematic sectional view of a part of an attachment housing arrangement 1.

The plug connector 100, whose hood is fastened at the attachment housing by the locking clip 12 is shown, on the one hand, in FIG. 4.

As already discussed above, the attachment housing arrangement 1 comprises a fixing slide 17, and is fitted in the region of the cover 23 with a solenoid magnet 20 and a plunger 21 as elements of the fastener 19. The cover 23 further comprises a position button 22 as a position detection means for the fixing slide 17 (and thus, indirectly, for the locking clip 12).

The fixing slide 17 is spring-mounted, and follows the clip movement in the vertical direction. The spring deflection is big enough for the slide 17 to be able to follow the respective locking clip 12 as far as the locked position and still to exercise a force on the clip 12 there. In the locked position (see FIG. 3), the solenoid magnet 20 can fix the slide 17 and thus the locking clip 12. The plunger 21 of the solenoid magnet 20 is pushed for this purpose horizontally into the guide of the slide 17 (e.g. with a compression spring in the solenoid magnet 20). When in the idle state, the plunger 21 is extended, and is pulled in when subjected to current. The position button 22 detects the position of the slide 17.

Figure 5:
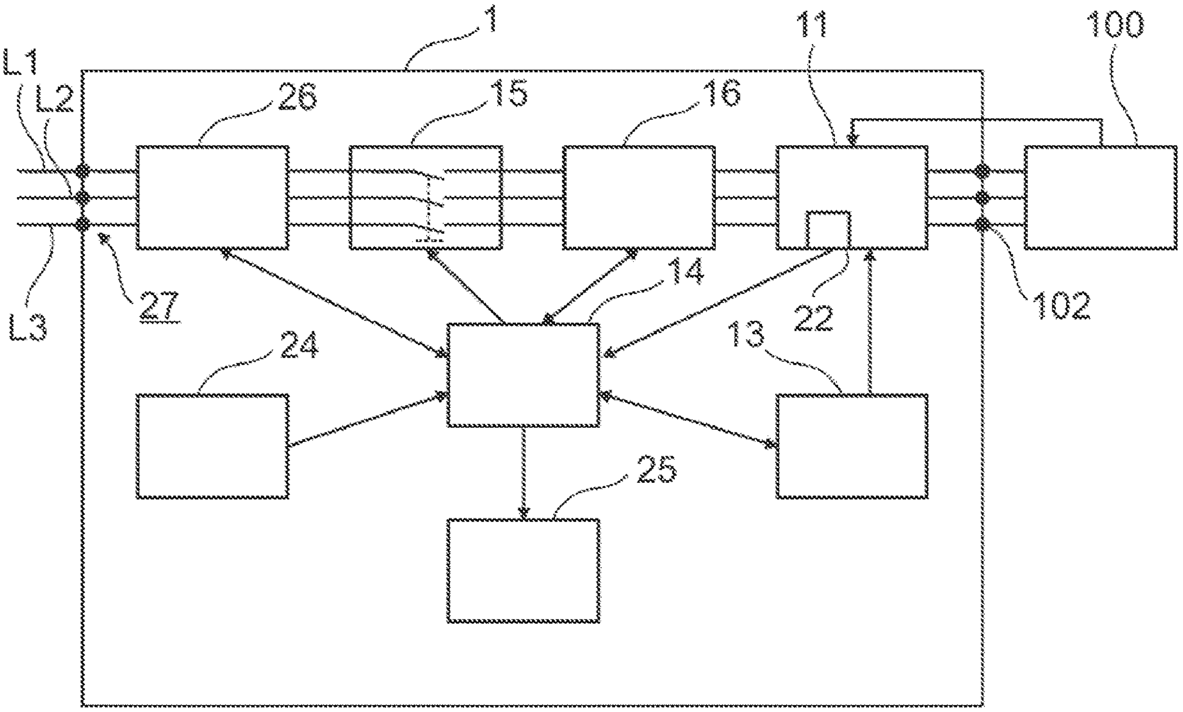
FIG. 5 shows a functional block diagram illustrating elements of an attachment housing arrangement.

FIG. 5 shows a functional block diagram illustrating elements of an attachment housing arrangement 1.

The attachment housing arrangement 1 comprises a mains connection 27, a current measuring unit 26, a contactor 15 as a circuit interrupter, a voltage measuring unit 16 and an attachment housing 11 (with a position detector 22) which extend through lines connected to the access lines L1, L2, L3 to the plug contacts 102 of a plug connector 100 that is plugged in at the attachment housing 11.

The attachment housing arrangement 1 further comprises a control unit 14, an operating unit 24 (in the form, perhaps, of a button), an LED 25 as a signal output unit and the fixing arrangement 13.

Figure 6:
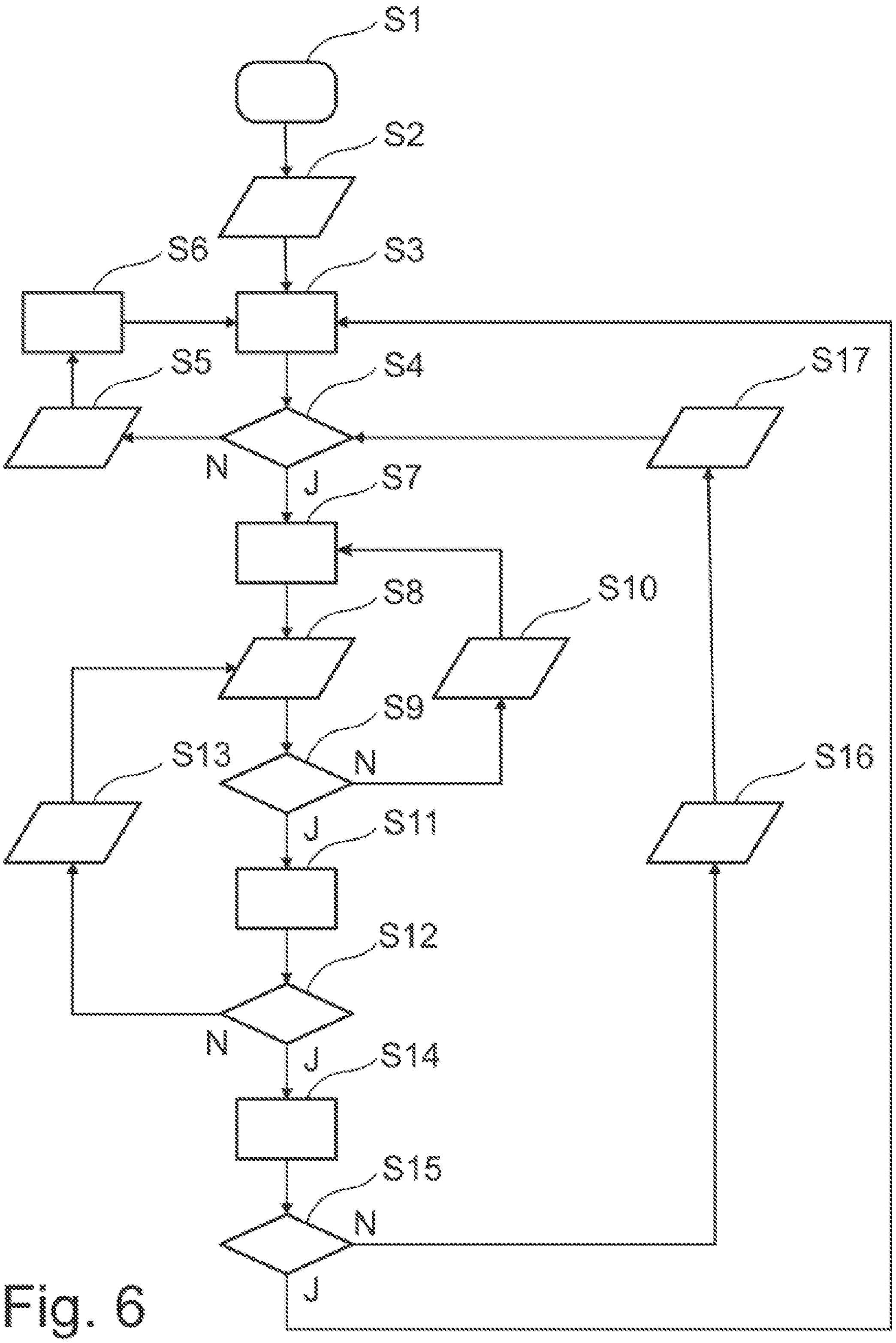
FIG. 6 shows a schematic flow diagram of an exemplary embodiment of the method with a locking and unlocking of a hood at an attachment housing.

The interaction of the elements with one another will also become clear on the basis of the following description of FIG. 6.

The disconnection 15 of the power circuit takes place between the current measurement 26 and voltage measurement 16 function blocks. As a result, the voltage on the machine side can be measured after disconnection of the power circuit.

The function blocks in FIG. 5 also show the respective signal connections to one another.

FIG. 6 shows a schematic flow diagram of an exemplary embodiment of the method with a locking and unlocking of a hood at an attachment housing.

An initialization, including checking the state of the plug, lock and button, takes place in step S1.

The LED, as an example of a signal output unit, indicates a signal sequence of "red", "green", "off", in step S2, in order to signal a successful initialization S1.

The attachment housing arrangement is ready for operation in step or state S3, wherein the contactor, as an example of a circuit interrupter, is opened and the LED is switched off.

Whether the plug is inserted and the lock locked and fixed is checked in step S4. If the result of this check is negative, the process moves forward to step S5, where pressing the button as an example of an operating unit is also expected. Following the press, an unlocking then takes place in step S6, wherein the fixing is unlocked for 15 seconds while the LED flashes green. The process then returns to step S3.

In the case of a positive test result in step S4, the process reaches the operating state (step S7) in which the contactor is closed (i.e. continuous) and the LED lights up green in order to in that way indicate the operating state.

If a button is pressed in step S8, then a current measurement and a check of whether the current is smaller than a current allowable for the further method, is made in step S9.

If the current is too high, the method continues to step S10, in which the LED flashes red and green in alternation for 10 seconds, after which the method returns to step S7.

In step S11, which results from a positive result of the current check in step S9, the mains is switched off and the contactor is opened.

The machine-side voltage (i.e. the voltage present in the plug connector) is measured for a period of, for example, 10 seconds in the following step S12, and a check is made as to whether the voltage has a magnitude that is lower than a predefined maximum permissible voltage.

If the check in step S12 has a negative result, step S13 follows, in which the LED flashes red to give an appropriate indication, after which the method returns to step S8.

If the voltage is sufficiently low, then after the check in step S12, unlocking follows in step S14 with release of the fixing of the locking clip by the fixing arrangement.

A check of whether the plug has been withdrawn takes place in step S15.

If the plug has not been withdrawn, the LED is switched off in step S16 for an appropriate signal output, and the method waits in step S17 for the button-push, after which it then continues to step S4.

If the plug has been withdrawn according to the check in step S15, the method returns to step S3.

A further embodiment of a locking and unlocking mechanism is shown in FIGS. 7*a-d* and 8*a-c*.

Figure 7A:
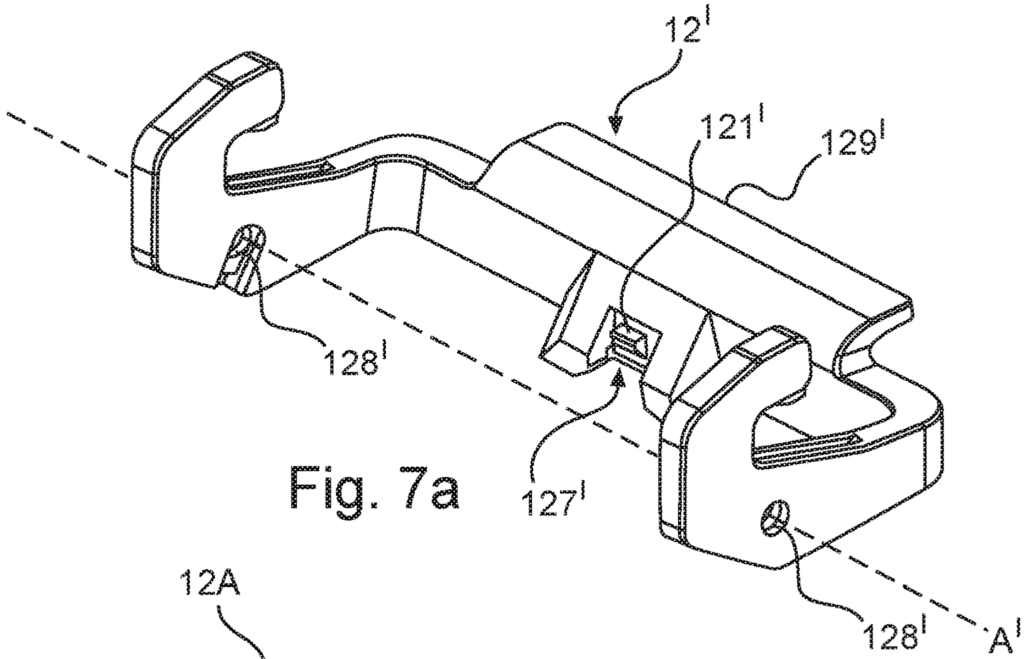
FIGS. 7*a-d* show a locking clip with a latching mechanism in a further embodiment.

FIG. 7*a* shows a locking clip 12' in the further embodiment. This locking clip has a latching mechanism 127'. This latching mechanism 127' has a sprung, retractable latching hook 121' which, in the locked state, serves to block the pivoting movement by latching the locking clip 12' to the attachment housing 11'. The latching hook 121' can be retracted into the locking clip 12' to release the locking clip 12'.

The locking clip 12' has a U-shaped basic form with an actuation handle 129' and two side pieces, not referenced, which extend from it perpendicularly. A cylindrical through-hole 128' is provided in each of the two side pieces as a fastening apparatus for a bearing axis, not illustrated. Although the bearing axis is not itself illustrated, it may run along the axis A' which is drawn with a dashed line.

Figure 7B:
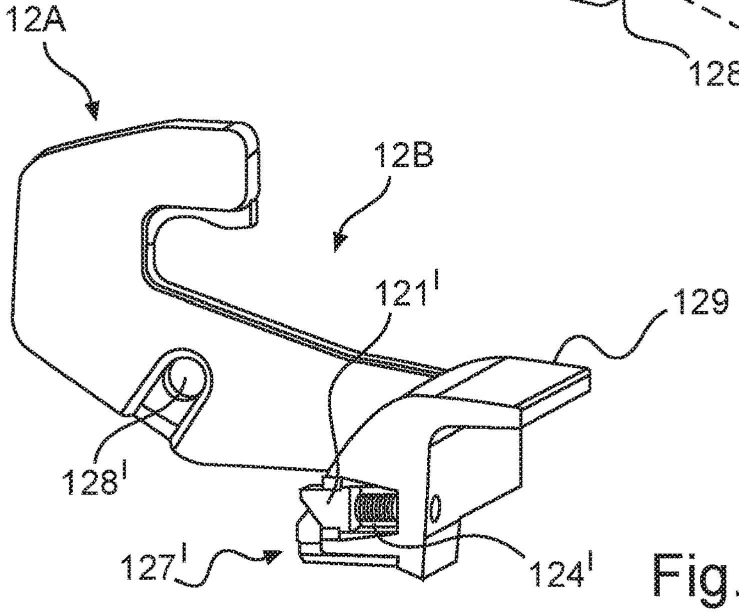

FIG. 7*b* shows a sectional view of the locking clip 12', wherein the section cut runs perpendicularly to the axis A' through the latching mechanism 127'. The through-hole 128' can, furthermore, be seen clearly. This through-hole 128' forms the boundary between a locking region 12A and an actuation region 12B of the locking clip 12', wherein the actuation handle 129' and the latching mechanism 127' belong to the actuation region 12B. The locking clip 12' can be held at the attachment housing 11' in a pivoting manner in the form of a rocker by means of the bearing axis.

The latching mechanism is arranged centrally at the actuation region 12B, and has a receiving chamber 124' to accommodate the latching hook 121'.

Figure 7C:
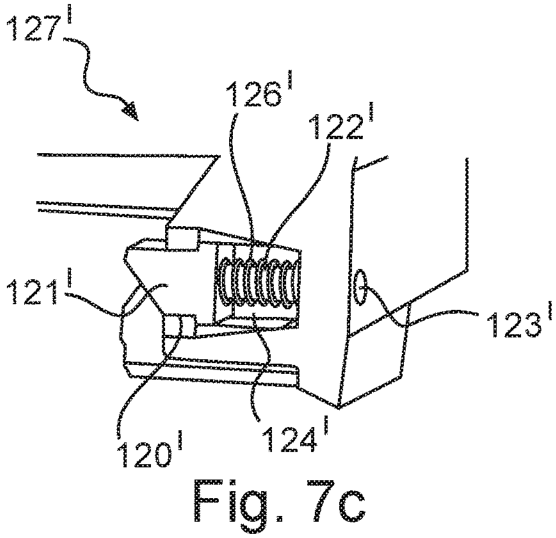
Figure 7D:
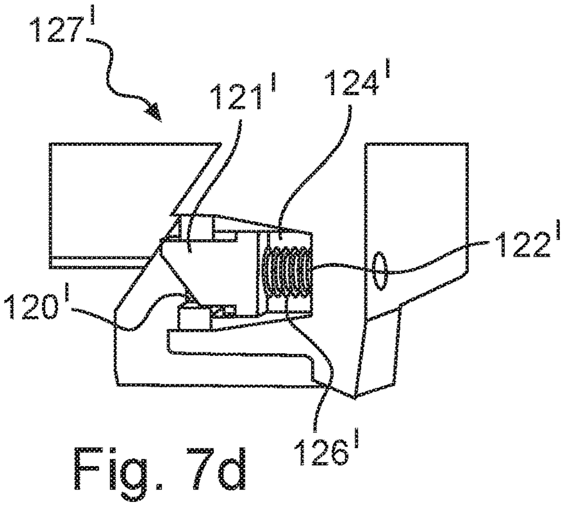

FIGS. 7*c* and 7*d* show the latching mechanism 127' in the locking and unlocking state.

The receiving chamber 124' has a window 120'. It has a retaining hole 123' in the form of a cylindrical through-hole, located opposite the window 120. To make assembly easier, it is advantageous that this hole goes all the way through, i.e. emerges from the locking clip on the handle side.

A cylindrical locking axis 126' is held with its first end in a movable manner in this retaining hole 124' and protrudes with its second end into the interior of the receiving chamber 124'. The latching hook 121' is attached at this second end, e.g. being screwed or molded on.

The locking axis 126' reaches through a helical spring 122'. The helical spring engages at the one end in the region around the through-hole 123' and at the other end at the latching hook 121'. It is configured to push the latching hook 121' with a spring force corresponding to its deflection out of its unlatching position through the window 120' of the receiving chamber 124' into its latching position.

At its end that protrudes from the window 120', the latching hook 121' has a slide slope oriented in the drawing to the left and downwards, and a latching surface, facing upwards in the drawing, by means of which it interacts in a latching manner when closing the locking clip 12' with the corresponding fixing arrangement 13'. The slide slope and the latching surface have not been given a reference sign for reasons of clarity.

Figure 8A:
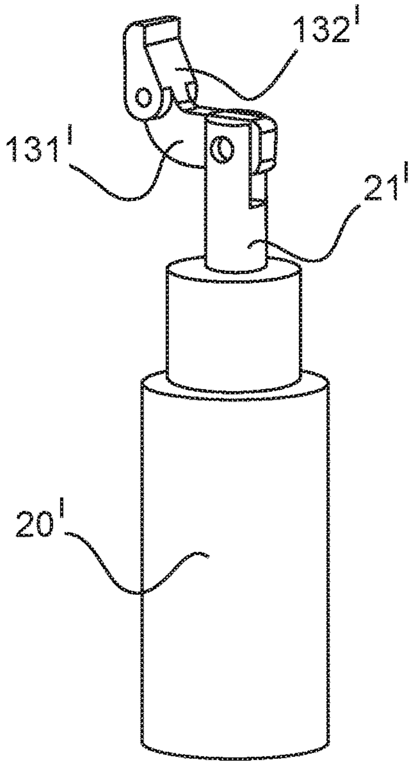
FIGS. 8*a-c* show an associated fixing arrangement in the further embodiment.
Figure 8B:
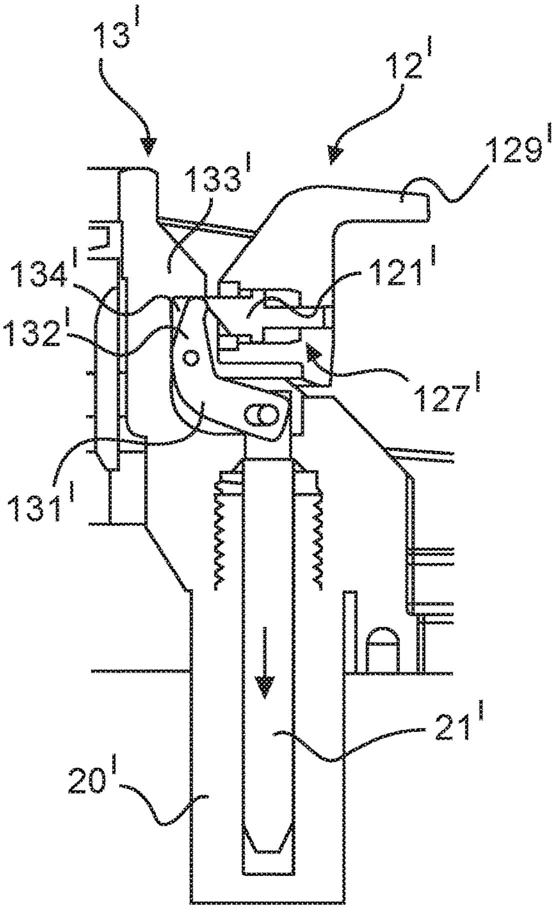
Figure 8C:
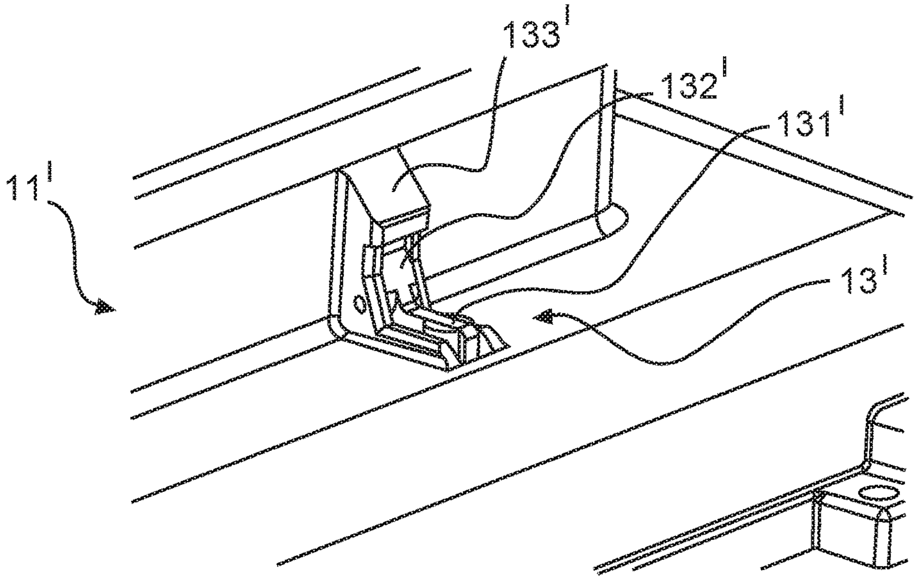

The locked state of the latching mechanism 127' illustrated in FIG. 7c is thus characterized in that the latching hook 121' protrudes with its latching surface far enough out of the window 120' that it latches with a latching recess or at least with a mating latching surface of the attachment housing 11' (to be seen in FIG. 8c).

The locked state of the latching mechanism 127' illustrated in FIG. 7d is thus characterized in that the latching hook 121' enters deeply enough into the receiving chamber 124' to unlatch from the latching recess 134' or the mating latching surface of the attachment housing 11'.

FIG. 8a shows the solenoid magnet 20' with its plunger 21', and an unlatching lever 131' attached via a pivoting axis movably to the plunger 21'. An unlatching hook 132' is integrally formed at the end of the unlatching lever 131'.

As can be seen from FIG. 8b, the unlatching lever 131' and the unlatching hook 132' are part of the modified fixing arrangement 13'. It can easily be seen that a plunger 21' moving in the direction of the arrow automatically causes a lever movement of the unlatching lever 131'. As a result, the unlatching hook 132' pushes the latching hook 121' deep enough into the receiving chamber 124' to remove it from a latching recess 134' of the attachment housing 11', and to separate its latching surface from the mating latching surface of a latching apparatus 133' of the attachment housing 11'.

FIG. 8c shows such an attachment housing 11' with a latching apparatus 133' through which a latching recess 134' is formed. The unlatching lever 131' is arranged therein with the unlatching hook 132'. It is easy to imagine how the locking clip 12', which is latched with its latching mechanism 127' to the latching apparatus 133' can be unlatched with the aid of the unlocking pin 132'.

Even though various aspects or features of the invention are respectively shown in combination in the figures, it is clear to the expert—except when otherwise stated—that the combinations illustrated and discussed are not the only possibilities. In particular, units corresponding to one another, or complexes of features from different exemplary embodiments, can be exchanged for one another.

LIST OF REFERENCE SIGNS

1 Attachment housing arrangement
11, 11' Attachment housing
12, 12' Locking clip
A' Axis
12A Locking region
12B Actuation region
120' Window
121' Latching hook
122' Locking axis
123' Retaining hole
124' Receiving chamber
126' Helical spring
127' Latching mechanism
128' Through-hole
129' Handle
13, 13' Fixing arrangement
131' Unlatching lever
132' Unlatching hook
133' Latching apparatus
134' Latching recess
14 Control unit
15 Circuit interrupter
16 Voltage measuring unit
17 Fixing slide
18 Spring
19 Fastener
20, 20' Solenoid magnet
21, 21' Plunger
22 Position detector
23 Cover
24 Operating unit
25 Signal output unit
26 Current measuring unit
27 Mains connection
28 Ethernet connection
100 Plug connector
101 Hood
102 Plug contact
L1, L2, L3 Mains line
S1 Initialization
S2 Signal output
S3 Ready-to-operate state
S4 Plug and locking check
S5 Button press
S6 Unlocking
S7 Operating state
S8 Button press
S9 Current check
S10 Signal output
S11 Mains switch-off
S12 Voltage check
S13 Signal output
S14 Unlocking
S15 Plug check
S16 Signal output
S17 Button press

The invention claimed is:

1. An attachment housing arrangement (1), comprising:
an attachment housing (11) for accommodating a hood (101) of a plug connector (100) with plug contacts (102);
a locking arrangement (12) for mechanically locking the hood (101) to the attachment housing (11);
a fixing arrangement (13, 13') for fixing the mechanical locking arrangement (12) in a locking state; and
a control unit (14) for controlling the fixing arrangement (13, 13'),
wherein the control unit (14) controls the fixing arrangement (13, 13') so as to release a fixing of the locking arrangement (12) only when the plug contacts (102) are free of current and free of voltage within predefined tolerances.

2. The attachment housing arrangement (1) as in claim 1, further comprising:
a circuit interrupter (15) to interrupt a line (L1, L2, L3) that leads to a plug contact (102); and
a voltage measuring unit (16) for measuring a voltage present at the plug contact (102),
wherein the voltage measuring unit (16) is arranged, in terms of the line (L1, L2, L3) between the circuit interrupter (15) and the plug contact (102).

3. The attachment housing arrangement (1) as in claim 2, wherein the circuit interrupter (15) is a contactor.

4. The attachment housing arrangement (1) as in claim 1, wherein the mechanical locking arrangement comprises at least one locking clip (12) which engages with the hood (101) in the locked state, wherein the fixing arrangement (13) comprises a fixing slide (17) that is placed against the locking clip (12) by a spring loading, and a fastener (19) for the fixing slide (17) in a position lying against the locking clip (12) when in the locking state.

5. The attachment housing arrangement (1) as in claim 1, wherein the mechanical locking arrangement comprises at least one locking clip (12') which engages with the hood (101) in the locked state, and wherein the locking arrangement has a spring-loaded latching hook (121') which can be retracted into the locking clip (12') for latching the locking clip (12') at the attachment housing (11, 11').

6. The attachment housing arrangement as in claim 5, wherein the fixing arrangement (13') comprises an unlatching lever (131') for retracting the latching hook (131') into the locking clip (12') to unlatch the locking clip (12') from the attachment housing (11').

7. The attachment housing arrangement (1) as in claim 1, further comprising a position capture (22) that is configured to ascertain whether the locking arrangement (12) is in the locking state.

8. The attachment housing arrangement (1) as in claim 7, further comprising a circuit interrupter (15) to interrupt a line (L1, L2, L3) that leads to a plug contact (102), wherein the control unit (14) is configured to control the circuit interrupter (15), wherein the control unit (14) only controls the circuit interrupter (15) to close the line (L1, L2, L3) when the position capture (22) ascertains that the locking arrangement (12) is in the locking state.

9. The attachment housing arrangement (1) as in claim 8, further comprising an operating unit (24), wherein the control unit (14) is configured only to control the circuit interrupter (15) to close the line (L1, L2, L3) in response to an operation of the operating unit (24).

10. The attachment housing arrangement (1) as in claim 1, wherein the attachment housing arrangement (1) comprises an operating unit (24), and wherein the control unit (14) is configured only to control the fixing arrangement (13) to release the fixing of the locking arrangement (12) in response to an operation of the operating unit (24).

11. The attachment housing arrangement (1) as in claim 1, further comprising a signal output unit (25) that is configured to output a signal that indicates an operating state of the attachment housing arrangement (1).

12. A non-transitory, computer readable storage device containing a computer program that causes the control unit (14) of an attachment housing arrangement (1) as in claim 1 to release the fixing of the locking arrangement (12) by the fixing arrangement (13) after checking (S9, S12) for a freedom of the plug contacts (102) from current and voltage within predefined tolerances if the plug contacts (102) are free of current and voltage within the predefined tolerances when the computer program is executed by the control unit (14).

13. A method for unlocking a mechanical locking of a hood (101) of a plug connector (100) with plug contacts (102) to an attachment housing (11) of an attachment housing arrangement (1), wherein the attachment housing arrangement (1) comprises a fixing arrangement (13) which fixes a mechanical locking arrangement (12) in a locking state, comprising the steps of:

checking (S9, S12) for a freedom of the plug contacts (102) from current and voltage within predefined tolerances;

releasing (S14) the fixing of the locking arrangement (12) by the fixing arrangement (13) after the check (S9, S12) if the plug contacts (102) are free of current and voltage within the predefined tolerances; and unlocking (S14) the locking (12) of the hood (101) after release of the fixing.

* * * * *